(12) United States Patent
Geng et al.

(10) Patent No.: US 11,646,001 B2
(45) Date of Patent: May 9, 2023

(54) DISPLAY DEVICE, DATA PROCESSOR, DATA PROCESSING METHOD, DRIVING METHOD, STORAGE MEDIUM, AND ELECTRONIC DEVICE

(71) Applicant: BOE TECHNOLOGY GROUP CO., LTD., Beijing (CN)

(72) Inventors: Lihua Geng, Beijing (CN); Ran Duan, Beijing (CN); Yanfu Li, Beijing (CN); Xitong Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 112 days.

(21) Appl. No.: 17/294,393

(22) PCT Filed: Apr. 30, 2020

(86) PCT No.: PCT/CN2020/088010
§ 371 (c)(1),
(2) Date: May 15, 2021

(87) PCT Pub. No.: WO2020/228545
PCT Pub. Date: Nov. 19, 2020

(65) Prior Publication Data
US 2022/0013093 A1    Jan. 13, 2022

(30) Foreign Application Priority Data
May 15, 2019    (CN) .......................... 201910403287.5

(51) Int. Cl.
*G09G 5/391*    (2006.01)
*G09G 3/20*    (2006.01)
*G09G 5/00*    (2006.01)

(52) U.S. Cl.
CPC ............... *G09G 5/391* (2013.01); *G09G 3/20* (2013.01); *G09G 5/006* (2013.01); *G09G 2340/0407* (2013.01)

(58) Field of Classification Search
CPC .. G09G 3/20; G09G 2340/0407; G09G 5/006; G09G 5/391
See application file for complete search history.

(56) References Cited

U.S. PATENT DOCUMENTS

2016/0140692 A1*  5/2016  Pais ..................... G06V 40/171
                                                       345/428

FOREIGN PATENT DOCUMENTS

CN    101155289 A    4/2008
CN    104981847 A    10/2015
(Continued)

OTHER PUBLICATIONS

China Patent Office, First Office Action dated May 6, 2020 for application No. CN201910403287.5.
(Continued)

*Primary Examiner* — Michelle L Sams
(74) *Attorney, Agent, or Firm* — Houtteman Law LLC

(57) ABSTRACT

There is provided a data processor for a display device including a display panel having a first resolution. The data processor includes a first mode selector and a player. The first mode selector includes a distance detector, a comparator, and a transmission resolution adjustor. The distance detector may detect a current distance between a viewer and a display surface of the display panel. The comparator determines an amount of change of the current distance from a previous distance. The transmission resolution adjustor determines a second resolution according to a threshold range within which the previous distance falls and the amount of change. The player processes received external (Continued)

image data as intermediate data having the second resolution.

19 Claims, 5 Drawing Sheets

(56) References Cited

FOREIGN PATENT DOCUMENTS

| | | |
|---|---|---|
| CN | 105051808 A | 11/2015 |
| CN | 105763959 A | 7/2016 |
| CN | 107463241 A | 12/2017 |
| CN | 107548556 A | 1/2018 |
| CN | 108490797 A | 9/2018 |
| CN | 109587559 A | 4/2019 |
| CN | 110085191 A | 8/2019 |
| JP | 2007047532 A | 2/2007 |
| JP | 2017103787 A | 6/2017 |
| JP | 2019049628 A | 3/2019 |

OTHER PUBLICATIONS

China Patent Office, Second Office Action dated Oct. 15, 2020 for application No. CN201910403287.5.
China Patent Office, Third Office Action dated Jul. 1, 2021 for application No. CN201910403287.5.
China Patent Office, Decision of rejection dated Feb. 3, 2021 for application No. CN201910403287.5.

* cited by examiner

DISPLAY DEVICE, DATA PROCESSOR, DATA PROCESSING METHOD, DRIVING METHOD, STORAGE MEDIUM, AND ELECTRONIC DEVICE

CROSS REFERENCE TO RELATED APPLICATIONS

This is a National Phase Application filed under 35 U.S.C. 371 as a national stage of PCT/CN2020/088010 filed on Apr. 30, 2020, an application claiming the priority of Chinese patent application No. 201910403287.5, filed on May 15, 2019, the content of each of which is incorporated herein by reference in its entirety.

TECHNICAL FIELD

The present disclosure relates to the field of display technologies, for example, to a data processor for a display device, a data processing method performed by the data processor, a display device including the data processor, a driving method for driving a display panel of the display device, a non-transitory computer readable storage medium, and an electronic device.

BACKGROUND

With the development of display technologies, a user has higher and higher requirements on the visual feeling of watching video images. Accordingly, high-resolution display devices (e.g., 8K display devices) have appeared.

An amount of data of an image to be displayed with a high resolution is large. Due to the limitation of a hardware performance, a speed of transmitting a large amount of image data to be displayed to a display panel of the display device is low, which is not favorable for the display device to normally display images.

SUMMARY

Embodiments of the present disclosure provide a data processor for a display device, a display device, a data processing method for the display device, a driving method for a display panel of the display device, a non-transitory computer readable storage medium, and an electronic device.

As a first aspect of the present disclosure, there is provided a data processor for a display device, the display device including a display panel having a first resolution, wherein the data processor includes a first mode selector and a player, and the first mode selector includes a distance detector, a comparator, and a transmission resolution adjustor;

the distance detector is configured to detect a distance between a viewer and a display surface of the display panel;

the comparator is configured to determine whether the distance between the viewer and the display surface of the display panel is outside a threshold range determined last time, and in response to the distance between the viewer and the display surface of the display panel being outside the threshold range determined last time, determine whether a distance between an endpoint, which is closest to the viewer, of the threshold range determined last time and the viewer exceeds a preset distance;

the transmission resolution adjustor is configured to determine a resolution corresponding to the threshold range determined last time as a second resolution in a case where the comparator determines that the distance between the endpoint, which is closest to the viewer, of the threshold range determined last time and the viewer does not exceed the preset distance, and is further configured to determine the second resolution according to the distance between the viewer and the display surface of the display panel in a case where the comparator determines that the distance between the endpoint, which is closest to the viewer, of the threshold range determined last time and the viewer exceeds the preset distance; and the player is configured to process received external image data as intermediate data having the second resolution.

In an embodiment, the data processor further includes a threshold setter, wherein the threshold setter is configured to preset a plurality of distance thresholds and a plurality of resolution thresholds, such that any adjacent two of the plurality of distance thresholds form a threshold range, each threshold range corresponds to one of the plurality of resolution thresholds, the plurality of resolution thresholds are decreased as distances between threshold ranges and the display surface of the display panel are increased, and any one of the plurality of resolution thresholds does not exceed the first resolution; and the transmission resolution adjustor is further configured to determine a threshold range within which the distance between the viewer and the display surface of the display panel falls, and determine, according to a preset mapping relationship between the threshold ranges and the plurality of resolution thresholds, a resolution threshold corresponding to the threshold range as the second resolution.

In an embodiment, the player includes a mode receiver and a plurality of data compressors cascaded to each other in a plurality of stages;

the data compressor in each of the plurality of stages is configured to compress received data as data such that a resolution of an image corresponding to the data is equal to one n-th of a resolution of an image corresponding to the received data, where n is a positive integer, an input terminal of the data compressor in a first stage of the plurality of stages is configured to receive external data, an output terminal of the data compressor in each of the plurality of stages is configured to output compressed data, and in two data compressors in any adjacent two of the plurality of stages, the input terminal of the data compressor in a next stage is electrically connected to the output terminal of the data compressor in a previous stage;

the mode receiver is configured to determine at least one data compressor among the plurality of data compressors that is required for compressing the external image data as the intermediate data according to the second resolution determined by the transmission resolution adjustor, and transmit a first enabling signal to the at least one data compressor that is determined to be required; and the at least one data compressor receiving the first enabling signal is configured to compress the received data and output compressed data, and in a case where at least two of the data compressors cascaded to each other in the plurality of stages of the player receive the first enabling signal, the data compressor in a previous stage is configured to output the compressed data to the data compressor in a next stage, and the data compressor in a last stage receiving the first enabling signal is configured to output the intermediate data.

In an embodiment, the preset distance does not exceed a height of the display panel.

In an embodiment, the player further includes a data transmitter configured to transmit the intermediate data to the display panel, the data transmitter includes a data distributor and a plurality of first transmission interfaces, each of the plurality of first transmission interfaces is configured to transmit a preset number of bytes of data, the data distributor is configured to divide the intermediate data into groups of data according to a size of the intermediate data, and distribute the groups of data to at least one of the plurality of first transmission interfaces.

In an embodiment, the player further includes a data transmitter configured to transmit the intermediate data to the display panel, the data transmitter includes a data distributor and a plurality of first transmission interfaces; and the mode receiver is further configured to receive mode information transmitted by the first mode selector, so as to control an operation mode of the plurality of data compressors and an operation mode of the data distributor.

In an embodiment, the data processor further includes a data reader, wherein the data reader is configured to read the external image data from a memory and transmit frame synchronization information to the mode receiver; and the mode receiver is configured to determine a start of an image frame according to the frame synchronization information in a case where the second resolution needs to be changed, and allow the second resolution to be changed after a current image frame ends and before a next image frame starts.

As a second aspect of the present disclosure, there is provided a display device, including:

the data processor according to any one of the embodiments of the first aspect of the present disclosure;

the display panel; and a driver for driving the display panel;

wherein the driver is configured to, after receiving the intermediate data, process the intermediate data to obtain final data corresponding to an image having the second resolution, and drive the display panel to display according to the final data.

In an embodiment, the driver includes a second mode selector, a driving unit, and a plurality of data amplifiers cascaded to each other in a plurality of stages, wherein the data amplifier in each of the plurality of stages is configured to amplify received data as data such that a resolution of an image corresponding to the data is equal to m times of a resolution of an image corresponding to the received data, where m is a positive integer, the data amplifier in a first stage of the plurality of stages is configured to receive the intermediate data, an output terminal of the data amplifier in each of the plurality of stages is configured to output amplified data, and in two data amplifier in any adjacent two of the plurality of stages, an input terminal of the data amplifier in a next stage is electrically connected to the output terminal of the data amplifier in a previous stage;

the second mode selector is configured to determine at least one data amplifier among the plurality of data amplifiers that is required for amplifying the intermediate data as the final data according to the intermediate data, and transmit a second enabling signal to the at least one data amplifier determined to be required;

the at least one data amplifier receiving the second enabling signal is configured to amplify the intermediate data and output amplified data, and in a case where the data amplifiers in at least two of the plurality of stages of the driver receive the second enabling signal, the data amplifier in a previous stage is configured to output the amplified data to the data amplifier in a next stage, and the data amplifier in a last stage receiving the second enabling signal is configured to output the final data; and the driving unit is configured to drive the display panel to display by using the final data.

In an embodiment, the player further includes a data transmitter configured to transmit the intermediate data to the display panel, the data transmitter includes a data distributor and a plurality of first transmission interfaces, each of the plurality of first transmission interfaces is configured to transmit a preset number of bytes of data, the data distributor is configured to divide the intermediate data into groups of data according to a size of the intermediate data, and distribute the groups of data to at least one of the plurality of first transmission interfaces;

the display device further includes a data receiver configured to receive the intermediate data and transmit the intermediate data to the driver;

the data receiver includes an interface selector and a plurality of second transmission interfaces, and the plurality of second transmission interfaces are connected in one-to-one correspondence with the plurality of first transmission interfaces of the data transmitter of the player; and the interface selector is configured to transmit a third enabling signal to at least one second transmission interface of the plurality of second transmission interfaces according to the second resolution, and the at least one second transmission interface receiving the third enabling signal is configured to transmit received data to the driver.

In an embodiment, the display device further includes a data receiver configured to receive the intermediate data and transmit the intermediate data to the driver, wherein the data receiver includes an interface selector and a plurality of second transmission interfaces, and the plurality of second transmission interfaces are connected in one-to-one correspondence with the plurality of first transmission interfaces of the data transmitter of the player; and the second mode selector is further configured to receive mode information transmitted by the first mode selector, so as to control an operation mode of the plurality of data amplifiers and an operation mode of the interface selector.

In an embodiment, the second mode selector is further configured to receive frame synchronization information transmitted by the data receiver; and the second mode selector is configured to determine a start of an image frame according to the frame synchronization information in a case where the second resolution needs to be changed, and allow the second resolution to be changed after a current image frame ends and before a next image frame starts.

As a third aspect of the present disclosure, there is provided a data processing method for a display device, wherein the display device includes a display panel having a first resolution, and the data processing method includes:

detecting a distance between a viewer and a display surface of the display panel;

determining whether the distance between the viewer and the display surface of the display panel is outside a threshold range determined last time, and in response to the distance between the viewer and the display surface of the display panel being outside the threshold range determined last time, determining whether a distance between an endpoint, which is closest to the viewer, of the threshold range determined last time and the viewer exceeds a preset distance;

determining a resolution corresponding to the threshold range determined last time as a second resolution in a case where it is determined that the distance between the endpoint, which is closest to the viewer, of the threshold range determined last time and the viewer does not exceed the preset distance, and determining the second resolution according to the distance between the viewer and the display surface of the display panel in a case where it is determined that the distance between the endpoint, which is closest to the viewer, of the threshold range determined last time and the viewer exceeds the preset distance; and processing received image data as intermediate data having the second resolution.

In an embodiment, the data processing method further includes, prior to the detecting a distance between a viewer and a display surface of the display panel: presetting a plurality of distance thresholds and a plurality of resolution thresholds, such that any adjacent two of the plurality of distance thresholds form a threshold range, each threshold range corresponds to one of the plurality of resolution thresholds, the plurality of resolution thresholds are decreased as distances between threshold ranges and the display surface of the display panel are increased, and any one of the plurality of resolution thresholds does not exceed the first resolution, wherein the determining the second resolution according to the distance between the viewer and the display surface of the display panel includes: determining a threshold range within which the distance between the viewer and the display surface of the display panel falls, and determining, according to a preset mapping relationship between the threshold ranges and the plurality of resolution thresholds, a resolution threshold corresponding to the threshold range as the second resolution.

In an embodiment, the preset distance does not exceed a height of the display panel.

In an embodiment, the data processing method further includes: determining a start of an image frame according to frame synchronization information in a case where the second resolution needs to be changed, and changing the second resolution after a current image frame ends and before a next image frame starts.

As a fourth aspect of the present disclosure, there is provided a driving method for a display panel, including:

processing data of an image by using the data processing method according to any one of the embodiments of the third aspect of the present disclosure;

transmitting the intermediate data to a driver for driving the display panel; and driving, by the driver, the display panel to display the intermediate data according to the second resolution.

In an embodiment, in a case where the second resolution is less than the first resolution, the driving, by the driver, the display panel to display the intermediate data according to the second resolution includes:

amplifying the intermediate data to obtain final data, wherein the final data corresponds to an image that has a resolution equal to the first resolution; and driving the display panel to display according to the final data.

As a fifth aspect of the present disclosure, there is provided a non-transitory computer readable storage medium having an executable program stored thereon, wherein the executable program is configured to implement the data processing method according to any one of the embodiments of the third aspect of the present disclosure.

As a sixth aspect of the present disclosure, there is provided an electronic device including a processor and a memory, wherein the memory is configured to store a computer program; and the processor is configured to execute the computer program stored in the memory to implement the data processing method according to any one of the embodiments of the third aspect of the present disclosure.

BRIEF DESCRIPTION OF THE DRAWINGS

The accompanying drawings, which are included for providing a further understanding of the present disclosure and constitute a part of this specification, are for explaining the present disclosure together with the following exemplary embodiments, but are not intended to limit the present disclosure. In the drawings.

DETAILED DESCRIPTION

The exemplary embodiments of the present disclosure will be described in detail below with reference to the accompanying drawings. It should be understood that, the exemplary embodiments described herein are merely for describing and explaining the present disclosure, but are not intended to limit the present disclosure.

Figure 1:
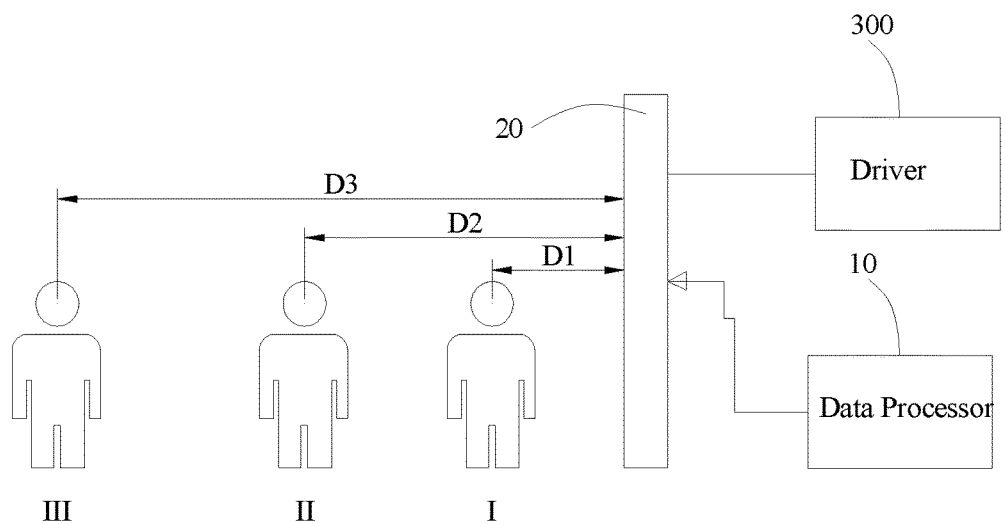
FIG. 1 is a schematic diagram showing a display device according to an embodiment of the present disclosure.
Figure 2:
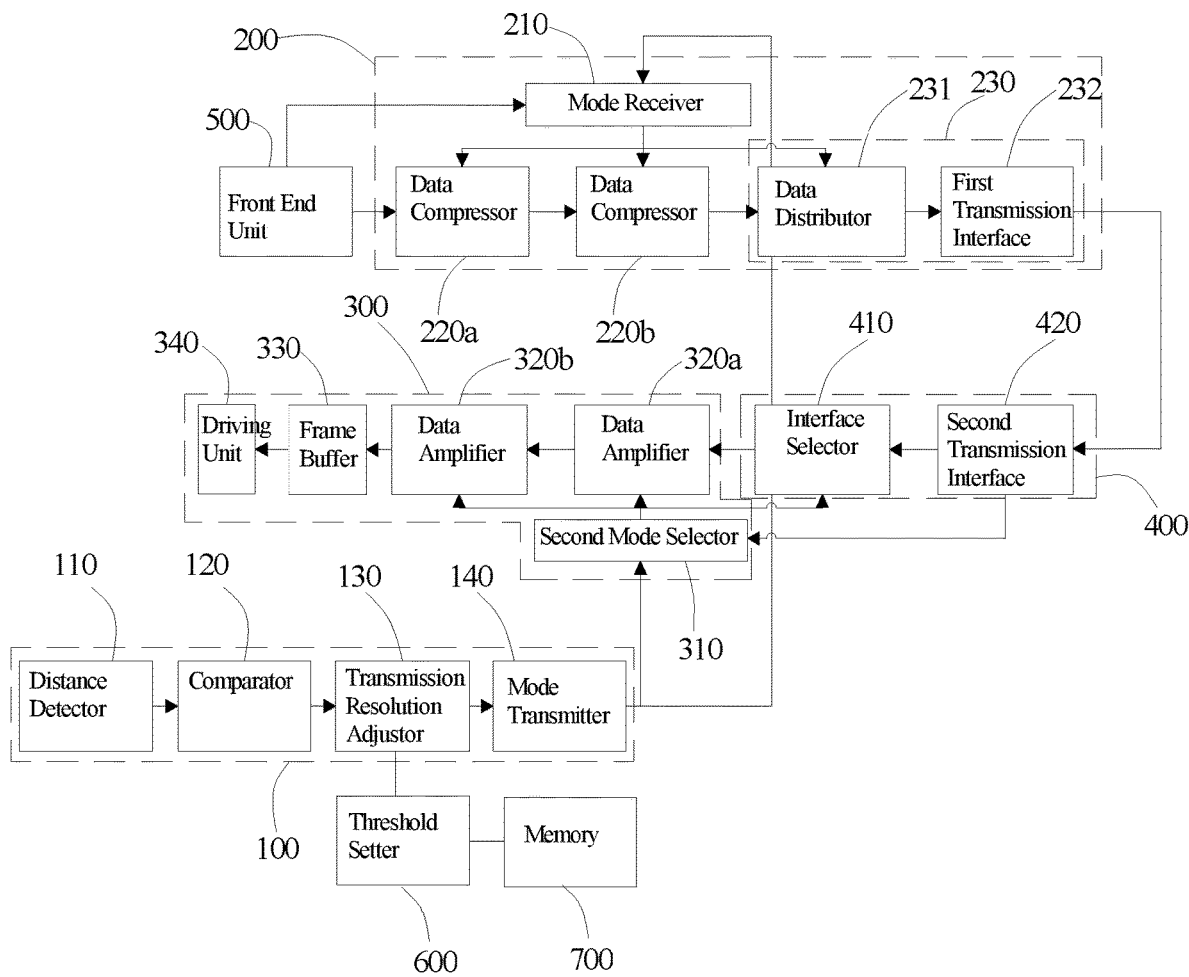
FIG. 2 is a schematic diagram showing a structure of a data processor and a structure of a driver according to an embodiment of the present disclosure.

As an aspect of the present disclosure, an embodiment of the present disclosure provides a data processor 10 for a display device including a display panel 20 having a first resolution, as shown in FIG. 1. As shown in FIG. 2, the data processor 10 may include a first mode selector 100 and a player 200. For example, the first mode selector 100 includes a distance detector 110, a comparator 120, and a transmission resolution adjustor 130.

In the first mode selector 100, the distance detector 110 may detect a distance between a viewer and a display surface of the display panel 20. In an embodiment, the distance detector 110 may be a distance sensor, a wide angle depth camera, a wide angle infrared distance sensor, or another device capable of detecting the distance between the viewer and the display surface of the display panel 20. The distance detector 110 may be installed at a center of a top side of a front surface (i.e., the display surface or a light emitting surface) of the display panel 20, and may detect the distance between the viewer in front (e.g., on the left side in FIG. 1) of the display panel 20 and the light emitting surface of the display panel 20. When there is only one viewer watching, the distance between the one viewer and the display panel 20 is regarded as an effective viewing distance; when there are a plurality of viewers watching, a distance between a detected viewer closest to the display panel 20 and the display panel 20 is regarded as the effective viewing distance; and when there is no viewer, the effective viewing distance may be infinite.

Figure 3:
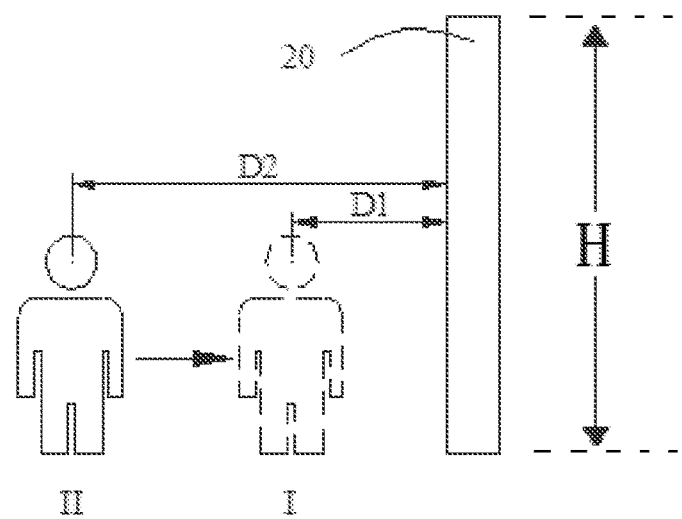
FIG. 3 is a schematic diagram showing a case where a second resolution needs to be switched according to an embodiment of the present disclosure.

The comparator 120 may determine whether the distance between the viewer and the display surface of the display panel 20 is outside a threshold range determined last time (or a preset threshold range), and may determine whether a distance between an endpoint, which is closest to the viewer, of the threshold range determined last time and the viewer exceeds a preset distance (e.g., the preset distance may be less than or equal to a height H of the display panel 20, as shown in FIG. 3), in response to the distance between the viewer and the display surface of the display panel 20 being outside the threshold range determined last time.

The transmission resolution adjustor 130 may determine a resolution corresponding to the threshold range determined last time as a second resolution, in a case where the comparator 120 determines that the distance between the endpoint, which is closest to the viewer, of the threshold range determined last time and the viewer does not exceed the preset distance. The transmission resolution adjustor 130 may further determine the second resolution according to the distance between the viewer and the display surface of the display panel, in a case where the comparator 120 determines that the distance between the endpoint, which is closest to the viewer, of the threshold range determined last time and the viewer exceeds the preset distance.

The player 200 may process received external image data as intermediate data having the second resolution.

As described above, the data processor 10 may be applied to the display device. When the display device operates, the data processor 10 may perform a data processing method, which may include the following steps.

The data processing method may include a step of detecting, by the distance detector 110, the distance between the viewer and the display surface of the display panel 20.

The data processing method may further include steps of determining, by the comparator 120, whether the distance between the viewer and the display surface of the display panel 20 is outside the threshold range determined last time, and in response to the distance between the viewer and the display surface of the display panel being outside the threshold range determined last time, determining, by the comparator 120, whether the distance between the endpoint, which is closest to the viewer, of the threshold range determined last time and the viewer exceeds the preset distance.

The data processing method may further include a step of determining, by the transmission resolution adjustor 130, the resolution corresponding to the threshold range determined last time as the second resolution, in a case where the comparator 120 determines that the distance between the endpoint, which is closest to the viewer, of the threshold range determined last time and the viewer does not exceed the preset distance.

The data processing method may further include a step of determining, by the transmission resolution adjustor 130, the second resolution according to the distance between the viewer and the display surface of the display panel, in a case where the comparator 120 determines that the distance between the endpoint, which is closest to the viewer, of the threshold range determined last time and the viewer exceeds the preset distance.

The data processing method may further include a step of processing, by the player 200, the received external image data as the intermediate data having the second resolution.

It should be noted that, before the data processor 10 executes the data processing method, the data processor 10 may determine the threshold range where the viewer is located in advance (i.e. the threshold range determined last time as described above) according to the distance between the viewer and the display surface of the display panel 20, to determine an initial second resolution. Further, if the distance between the viewer and the display surface of the display panel 20 is within the threshold range determined last time, a second resolution (i.e., the initial second resolution) corresponding to the threshold range determined last time is determined as a final second resolution.

In an embodiment, the larger the distance between the threshold range where the viewer is located and the display surface of the display panel 20 is, the smaller the initial second resolution is; and the smaller the distance between the threshold range where the viewer is located and the display surface of the display panel 20 is, the larger the initial second resolution is. It is readily understood that, the larger the second resolution is, the more detail the intermediate data includes; and the smaller the second resolution is, the less detail the intermediate data includes. Further, the expression of "the distance between the threshold range where the viewer is located and the display surface of the display panel 20" may refer to a distance between a midpoint of the threshold range where the viewer is located and the display surface of the display panel 20.

In a case where the distance between the viewer and the display surface of the display panel is small, the details of an image displayed on the display panel may be recognized. In this case, the intermediate data with a high second resolution is transmitted to the display panel, and the display panel is driven to display an image with plentiful details, such that a visual experience of the viewer is improved.

In a case where the distance between the viewer and the display surface of the display device is large, the details of the image displayed on the display panel may not be recognized, but only an outline of the image may be seen clearly. In this case, the intermediate data with a low second resolution is transmitted to the display panel to display an image with less details, such that a speed of data transmission and a smoothness of image display may be improved.

In the present disclosure, the second resolution is not a fixed value, but may be changed as the viewer moves. After the second resolution is determined for a first time, it is subsequently determined whether to re-determine a new second resolution according to whether the viewer moves during watching and according to a movement distance for the viewer. When the viewer moves outside the threshold range determined last time but does not exceed the threshold range determined last time too much (i.e., does not exceed the preset distance), the previous second resolution may not be adjusted, thereby avoiding phenomena such as unsmooth transmission and the like caused by frequent adjustment of the second resolution, and thus avoiding phenomena such as an unsmooth displayed picture stream (i.e., discontinuous phenomena, or discontinuous and unsmooth phenomena) when the display panel displays images.

For example, the visual senses of the viewer viewing a same image on both sides, each of which is within the preset distance from an endpoint of the threshold range, of the endpoint of the threshold range are almost the same. That is, even if the viewer is in two different distance ranges, the visual senses of the viewer viewing the same image may be almost the same. Taking FIG. 3 as an example, there is almost no difference in visual sense of viewing an image displayed on the display panel driven by the intermediate data with a 2K resolution at a position having a small distance (e.g., 1 cm) from the right of position I and at a position having a small distance (e.g., 1 cm) from the left of position I. Thus, the second resolution is not required to be changed when the viewer moves between a position having the preset distance from the left of position I and a position having the preset distance from the right of position I. The second resolution is adjusted only if the viewer moves a large distance (which is beyond the preset distance from the left of position I or the preset distance from the right of position I).

It should be noted that, the "external image data" may be image data such as pictures, videos, and/or texts provided by an external storage device, or may be image data such as pictures, videos, and/or texts provided by a broadcast television stream. The resolution of the image corresponding to the "external image data" is usually the first resolution.

In the present disclosure, a relationship between a resolution of the display panel 20 and the first resolution is not limited. As an optional embodiment, the display panel 20 may have the first resolution. Further optionally, the resolution threshold does not exceed the first resolution. In other words, the second resolution does not exceed the first resolution. The expression of "the second resolution does not exceed the first resolution" includes two cases, one of which is the case where the second resolution is equal to the first resolution, and the other is the case where the second resolution is less than the first resolution.

When the viewer is close enough to the display surface of the display panel 20 of the display device, the second resolution may be equal to the first resolution, so as to ensure that the viewer may see more image details, and have a better viewing experience when viewing images at a near distance.

When the viewer is far away from the display surface of the display panel 20 of the display device, the second resolution is less than the first resolution, which is equivalent to performing reduction (or compression) on the received external image. Compared with the case where original external image data is transmitted, the case where intermediate data corresponding to an image with a smaller second resolution (i.e., data obtained by reducing or compressing data of the original external image) is transmitted may result in the advantages that an amount of data to be transmitted is smaller, a power consumption for transmitting the data is reduced, bandwidth is saved, and a transmission speed is increased.

In the present disclosure, the distance between the viewer and the display surface of the display device may be tested after the position of the viewer in front of the display surface is fixed (or unchanged) for a preset time period (e.g., after the viewer stops moving for 3 seconds), which may avoid frequently changing the second resolution, thereby ensuring stabilization of the display effect. Alternatively, the distance between the viewer and the display surface of the display device may be measured in real time.

As described above, in the present disclosure, it is necessary to determine the initial second resolution according to the distance between the viewer and the display surface of the display device. In order to reduce a computation amount, optionally, the data processor 10 (e.g., the first mode selector 100 of the data processor 10) may further include a threshold setter 600, and the threshold setter 600 may preset a plurality of distance thresholds and a plurality of resolution thresholds, wherein any adjacent two of the plurality of distance thresholds form a threshold range, each threshold range corresponds to one of the plurality of resolution thresholds, the plurality of resolution thresholds are decreased as distances between threshold ranges (e.g., midpoints of the threshold ranges) and the display surface of the display panel are increased. Further, as shown in FIG. 2, the data processor 10 (e.g., the first mode selector 100 of the data processor 10) may further include a memory 700 connected to the threshold setter 600 and for storing the distance thresholds, the resolution thresholds, the threshold ranges, correspondence relationships between the threshold ranges and the resolution thresholds, the intermediate data, computer programs, and other required data in the present disclosure.

Correspondingly, the transmission resolution adjustor 130 may further determine the threshold range where (or within which) the distance between the viewer and the display surface of the display panel falls, and determine the resolution threshold corresponding to each threshold range as the second resolution, according to a preset mapping relationship between the threshold ranges and the plurality of resolution thresholds.

For ease of understanding, for example, a total of n distance thresholds of $D1, D2, D3, \ldots, Dn$ may be set, where $Dn> \ldots >D3>D2>D1>0$. In addition, a total of n+1 resolution thresholds of $R0, R1, R2, R3, \ldots, Rn$ may be set, where R0 is the first resolution, and $R0>R1>R2>R3> \ldots >Rn$. Here, n may be a positive integer greater than or equal to 2.

For example, the n distance thresholds may form n+1 threshold ranges (i.e., n distance thresholds between the viewer and the display panel 20 may form n+1 threshold ranges), and the n+1 threshold ranges are $[0, D1], [D1, D2], [D2, D3], \ldots, [Dn, +\infty)$, respectively. The n+1 threshold ranges $[0, D1], [D1, D2], [D2, D3], \ldots, [Dn, +\infty)$ are in one-to-one correspondence with the n+1 resolution thresholds $R0, R1, R2, R3, \ldots, Rn$. For convenience of description, the preset distance is denoted by L.

If it is determined for the first time that the distance between the viewer and the display surface is within the threshold range $[0, D1]$, the second resolution is equal to the first resolution, i.e., the second resolution is R0. If the viewer moves such that a distance between viewer and the display surface of the display panel exceeds D1 but does not exceed D1+L, the second resolution is still R0. If it is determined for the first time that the distance between the viewer and the display surface is within the threshold range $[D1, D2]$, the second resolution is R1. If the viewer moves such that a distance between the viewer and the display surface of the display panel is less than D1 but greater than or equal to D1−L, the second resolution is still R1. If the viewer moves such that a distance between the viewer and the display panel exceeds D2 but is less than or equal to D2+L, the second resolution is still R1. If the distance between the viewer and the display surface is determined to be within the threshold range $[D2, D3]$ for the first time, the second resolution is R2. If the viewer moves such that a distance between the viewer and the display surface of the display panel is less than D2 but greater than or equal to D2−L, the second resolution is still R2. If the viewer moves such that a distance between the viewer and the display panel exceeds D3 but is less than or equal to D3+L, the second resolution is still R2; . . . . If it is determined for the first time that the distance between the viewer and the display surface is within the threshold range [Dn, +∞), the second resolution is Rn. If the viewer moves such that a distance between the viewer and the display surface of the display panel is less than Dn but greater than or equal to Dn–L, the second resolution is still Rn.

In other words, the mapping relationship (or correspondence relationship) between the n+1 threshold ranges and the n+1 resolution thresholds is as follows:

the threshold range [0, D1] corresponds to the resolution threshold R0;
the threshold range [D1, D2] corresponds to the resolution threshold R1;
the threshold range [D2, D3] corresponds to the resolution threshold R2;
. . . ; and
the threshold range [Dn, +∞) corresponds to the resolution threshold Rn.

It should be noted that different pairs of adjacent two of the distance thresholds form different threshold ranges, each of the threshold ranges corresponds to one of the n+1 resolution thresholds, and different positions in a same threshold range correspond to a same resolution threshold.

In the present disclosure, the first resolution and the resolution thresholds are not limited. As an embodiment, optionally, the first resolution is 8K (e.g., 7680×4320), and in this case, the plurality of resolution thresholds may be 8K, 4K (e.g., 3840×2160), 2K (e.g., 1920×1080), and 1K (e.g., 960×540), respectively.

The relationship among the distance thresholds, the resolution thresholds, and the second resolution will be described below with reference to FIG. 1, by taking a case where the first resolution is 8K as an example.

In FIG. 1, there are shown three distance thresholds, which are a distance D1 between a position I and the display surface of the display panel 20, a distance D2 between a position II and the display surface of the display panel 20, and a distance D3 between a position III and the display surface of the display panel 20. The data processor 10 may perform the following presets: the resolution threshold corresponding to the distance D1 is 8K, the resolution threshold corresponding to the distance D2 is 4K, the resolution threshold corresponding to the distance D3 is 2K, and the resolution threshold corresponding to other distances greater than the distance D3 is 1K.

In the first determination of the second resolution, the second resolution is determined to be 8K if the distance between the viewer and the display surface of the display panel 20 is less than or equal to the distance D1, the second resolution is determined to be 4K if the distance between the viewer and the display surface of the display panel 20 is between the distance D1 and the distance D2 (e.g., greater than the distance D1 and equal to or less than the distance D2), the second resolution is determined to be 2K if the distance between the viewer and the display surface of the display panel 20 is between the distance D2 and the distance D3 (e.g., greater than the distance D2 and equal to or less than the distance D3), or the second resolution is determined to be 1K if the distance between the viewer and the display surface of the display panel 20 exceeds (i.e., is greater than) the distance D3.

In an embodiment, the first mode selector 100 may further include a mode transmitter 140, and the mode transmitter 140 may transmit a signal indicative of the second resolution determined by transmission resolution adjustor 130 to the player 200.

In the present disclosure, a structure and composition of the player 200 are not particularly limited as long as the player 200 may process the received external image data as the intermediate data having the second resolution. As an exemplary embodiment, the player 200 includes a mode receiver 210 and a plurality of data compressors cascaded to each other in a plurality stages (as an example, in FIG. 2, there are shown two data compressors cascaded in two stages, which are a data compressor 220a in a first stage and a data compressor 220b in a second stage, respectively).

Each of the data compressors may compress the received data to data having an image resolution that is one Nc-th of an image resolution corresponding to the received data, where Nc is a positive integer. An input terminal of the data compressor 220a in the first stage may receive the external data, an output terminal of each of the data compressor in each of the plurality stages may output compressed data. In the data compressors in any adjacent two stages, the input terminal of the data compressor in the next stage is electrically connected to the output terminal of the data compressor in the previous stage.

The mode receiver 210 may determine at least one data compressor required to compress the external image data to the intermediate data according to the second resolution determined by the transmission resolution adjustor 130, and send a first enabling signal to the determined at least one data compressor.

The at least one data compressor receiving the first enabling signal may compress the received data and output the compressed data. In a case where the data compressors in at least two stages among the data compressors cascaded to each other in the plurality of stages of the player receive the first enabling signal, the data compressor in the previous stage outputs the compressed data to the data compressor in the next stage, and the data compressor in the last stage receiving the first enabling signal outputs the intermediate data.

In the exemplary embodiment shown in FIG. 2, the player 200 includes the data compressors in two stages in total, i.e., the data compressor 220a and the data compressor 220b. For example, the data compressor 220a is the data compressor in the first stage, and the data compressor 220b is the data compressor in the second stage. The input terminal of the data compressor 220a may receive the external data, and the data compressor 220b may receive the data from the data compressor 220a.

As an embodiment, Nc may be 2. In order to compress the external data as the intermediate data having a resolution equal to one half of a resolution of the external image (i.e., an image corresponding to the external data), the mode receiver 210 may transmit the first enabling signal to only the data compressor 220a. In order to compress the data of an external image as the intermediate data having a resolution equal to one fourth of a resolution of the external image, the mode receiver 210 may transmit the first enabling signal to the data compressor 220a and the data compressor 220b. The data compressor 220a may compress the received data of the external image as the data having a resolution equal to one half of the resolution of the external image, and the data compressor 220b may compress the data output from the data compressor 220a as the intermediate data having a resolution equal to one half of a resolution of an image corresponding to the data output from the data compressor 220a, such that the intermediate data has a resolution equal to one fourth of the resolution of the external image.

As described above, as an exemplary embodiment, the first resolution may be 8K, and correspondingly, the second resolution may be one selected from 8K, 4K, and 2K. Further, in a case where the player 200 includes data compressors in three stages which are the data compressor 220a in the first stage, the data compressor 220b in the second stage, and a data compressor (not shown) in a third stage, the second resolution may be one selected from 8K, 4K, 2K, and 1K. The operation principle of the data processor 10 provided by the present disclosure will be explained below with reference to FIGS. 3 to 5.

As shown in FIG. 3, when the viewer starts viewing an image at the position II, the second resolution needs to be set to 4K, and when the viewer moves toward the display surface and finally moves to the position I within a preset time period, the movement distance is large and exceeds the preset distance (e.g., the distance between the viewer and the display surface is equal to or less than (D1−L)). In this case, the second resolution may be set to 8K.

Figure 4:
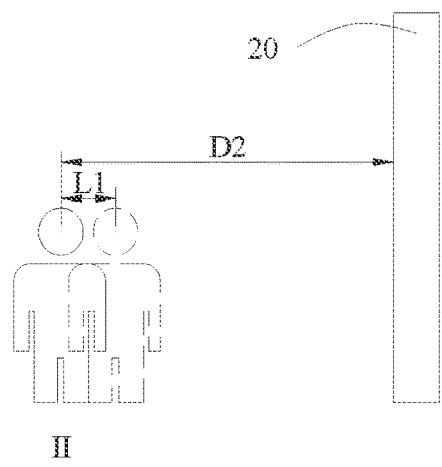
FIGS. 4 and 5 are schematic diagrams showing two cases where the second resolution does not need to be switched according to embodiments of the present disclosure.

As shown in FIG. 4, when the viewer starts viewing an image at the position II, the second resolution needs to be set to 4K, and when the viewer moves toward the display surface by a small distance L1 within a preset time period, the movement distance is too small to exceed the preset distance (i.e., L1≤L). In this case, the second resolution may not be changed.

Figure 5:
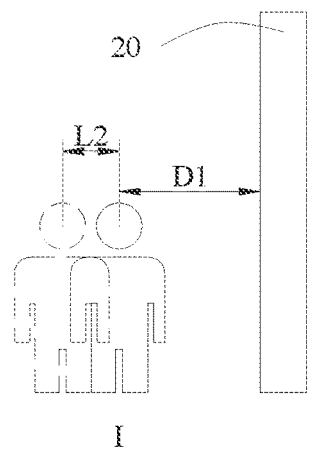

As shown in FIG. 5, when the viewer starts viewing an image at the position I, the second resolution needs to be set to 8K, and when the viewer moves away from the display surface by a small distance L2 within a preset time period, the movement distance is too small to exceed the preset distance (i.e., L2≤L). In this case, the second resolution may not be changed.

In the present disclosure, the preset distance is not particularly limited, and may be determined according to the height of the display panel 20. As an exemplary embodiment, the preset distance does not exceed the height H of the display panel 20, as shown in FIG. 3. For example, the preset distance may be equal to the height H of the display panel 20.

Optionally, the preset distance is between 0.5 m and 1.5 m.

In the present disclosure, an endpoint of each of the threshold ranges may also be determined according to the height H of the display panel 20.

For example, an endpoint D1 of the threshold range corresponding to the second resolution of 8K may be 2 times the height H of the display panel 20, and an endpoint D2 of the threshold range corresponding to the second resolution of 4K may be 7 times the height H of the display panel.

Optionally, the player 200 further includes a data transmitter 230, and the data transmitter 230 may transmit the intermediate data to the display panel 20.

Figure 6:
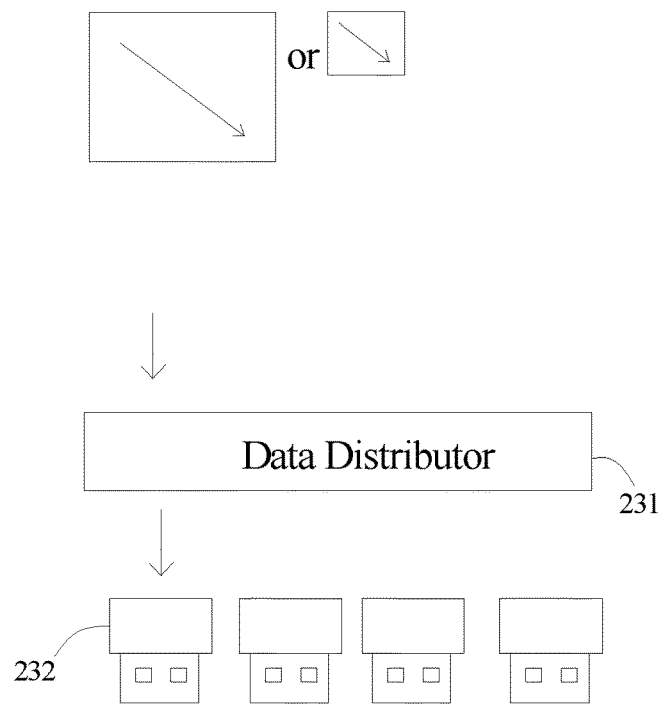
FIG. 6 is a schematic diagram showing transmission of intermediate data corresponding to an image with a 2K or 4K resolution according to an embodiment of the present disclosure.
Figure 7:
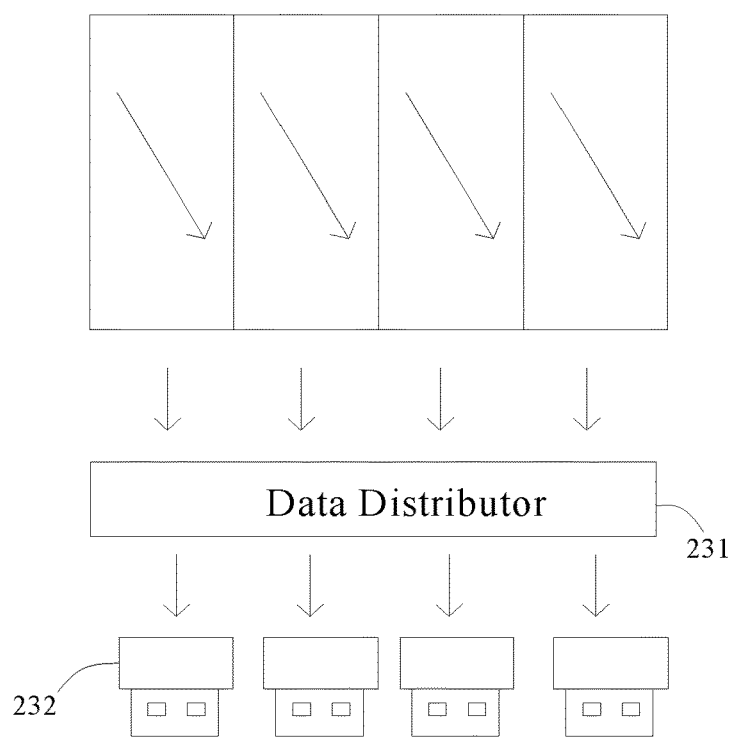
FIG. 7 is a schematic diagram showing transmission of intermediate data corresponding to an image with an 8K resolution according to an embodiment of the present disclosure.

The intermediate data with different second resolutions has different amounts of data, and thus optionally, the data transmitter 230 includes a data distributor 231 and a plurality of first transmission interfaces 232 (as an example, one first transmission interface 232 is shown in FIG. 2, and four first transmission interfaces 232 are shown in FIGS. 6 and 7). Each first transmission interface 232 may transmit a preset number of bytes of data. The data distributor 231 may divide the intermediate data into groups of data according to a size of the intermediate data, and distribute the groups of data to at least one of the first transmission interfaces 232.

The data distributor 231 may further convert the intermediate data into data conforming to a protocol corresponding to the first transmission interface 232 that is to receive the intermediate data, such that the first transmission interface 232 may transmit the intermediate data.

In the present disclosure, a type of each of the first transmission interfaces 232 is not particularly limited. For example, the plurality of first transmission interfaces 232 may be 4 HDMI2.0 interfaces (i.e., 4× HDMI2.0). Alternatively, the plurality of first transmission interfaces 232 may be 16 DVI interfaces (i.e., 16×DVI), or 4 DP1.2 interfaces (i.e., 4× DP1.2). Further alternatively, each of the first transmission interfaces may be a SDI interface, a SuperHML interface, or the like.

In a case where an amount of data is small, less first transmission interfaces 232 may be enabled to transmit data, and in a case where an amount of data is large, more first transmission interfaces 232 may be enabled to transmit data.

For example, in a case where the plurality of first transmission interfaces 232 are 4 HDMI2.0 interfaces, if the second resolution is 1K, 2K, or 4K, the data distributor 231 may divide the intermediate data into only one group of data and then distribute the group of data to one first transmission interface 232 (e.g., a first one of 4 first transmission interfaces 232 as shown in FIG. 6) of the plurality of first transmission interfaces 232; and if the second resolution is 8K, the data distributor 231 may divide the intermediate data into four groups of data, and then distribute the four groups of data to the four first transmission interfaces 232, respectively (as shown in FIG. 7).

Further, the mode receiver 210 may further receive mode information (e.g., an enabling signal) sent by the first mode selector 100, so as to control an operation mode of the data compressors in the plurality of stages (e.g., a data compressor among the data compressors in the plurality of stages that needs to compress data) and an operation mode of the data distributor 231 (e.g., a mode in which the data distributor 231 distributes data to at least one of the first transmission interfaces 232).

In the present disclosure, there is no particular limitation on how the external image data is acquired. As an exemplary embodiment, the data processor may include a front end unit (e.g., a data reader) 500, and the front end unit 500 may acquire the external image data from an external device (e.g., a memory) and transmit the external image data to the player 200.

If the external image data is video data, the external image data may include frame synchronization information in addition to grayscale information. The player 200 may receive the grayscale information and the frame synchronization information. In this case, the front end unit (e.g., the data reader) 500 may further transmit the frame synchronization information to the mode receiver 210. The mode receiver 210 may determine the start of an image frame according to the frame synchronization information, when the second resolution needs to be changed, and allows the second resolution to be changed after the end of the current image frame and before the start of the next image frame. In this way, it is possible to prevent the operation mode (e.g., the second resolution) from being changed during processing one frame of image, thereby preventing a phenomenon of tearing or damaging an image.

As a second aspect of the present disclosure, there is provided a display device, as shown in FIG. 1, which may include the display panel 20 and a driver 300 for driving the display panel 20. Further, the display device may further include the above-described data processor 10 according to the present disclosure. As described above, the data processor 10 may process data corresponding to an external image as the intermediate data having the second resolution. The driver 300 may receive the intermediate data and then process the intermediate data to obtain final data corresponding to an image having the second resolution, and drive the display panel 20 to display according to the final data.

In the display device, the data processor 10 may determine whether to adjust the second resolution according to the distance between the viewer and the display surface of the display panel and a movement distance of the viewer, thereby improving a data transmission speed and avoiding a phenomenon such as an unsmooth displayed picture stream when the display panel displays images due to frequent adjustment of the second resolution.

In order to receive intermediate data having a large data amount, optionally, the driver 300 includes a second mode selector 310, a driving unit 340, and data amplifiers cascaded to each other in a plurality of stages (as an example, in the embodiment shown in FIG. 2, the driver 300 includes a data amplifier 320a and a data amplifier 320b cascaded to each other in two stages).

The data amplifier in each stage may amplify the received data as data such that a resolution of an image corresponding to the data is m times of a resolution of an image corresponding to the received data, where m is a positive integer. For example, the data amplifier 320a in a first stage among the data amplifiers in the plurality of stages may receive the intermediate data (i.e., the data received by the data amplifier 320a in the first stage is the intermediate data), and an output terminal of the data amplifier in each of the plurality of stages may output the amplified data. In two data amplifiers in any adjacent two of the plurality of stages, an input terminal of the data amplifier in the next stage is electrically connected to an output terminal of the data amplifier in the previous stage.

The second mode selector 310 may determine a data amplifier among the data amplifiers in the plurality of stages required to amplify the intermediate data as the final data according to the intermediate data, and transmit a second enabling signal to the determined data amplifier.

The data amplifier receiving the second enabling signal may amplify the intermediate data and output the amplified data. In a case where the data amplifiers cascaded to each other in at least two of the plurality of stages in the driver 300 receive the second enabling signal, the data amplifier in the previous stage outputs the amplified data to the data amplifier in the next stage, and the data amplifier in the last stage receiving the second enabling signal outputs the final data.

The driving unit 340 may drive the display panel 20 to display by using the final data.

In the embodiment shown in FIG. 2, the driver 300 includes two data amplifiers in two stages, which are the data amplifier 320a in the first stage and the data amplifier 320b in a second stage, respectively. As an exemplary embodiment, m may be 2.

When the final data has a resolution (i.e., the current second resolution) of 8K and the driver 300 receives the intermediate data having a resolution of 4K, the second mode selector 310 may determine the data amplifier 320b in the second stage as a data amplifier required to amplify the intermediate data as the final data, and may transmit the second enabling signal to the data amplifier 320b in the second stage, thereby causing the data amplifier 320b in the second stage to amplify the intermediate data having the resolution of 4K as the final data having the resolution of 8K.

When the final data has a resolution of 8K and the driver 300 receives the intermediate data having a resolution of 2K, the second mode selector 310 may determine both the data amplifier 320a in the first stage and the data amplifier 320b in the second stage as data amplifiers required to amplify the intermediate data as the final data, and may transmit the second enabling signal to both the data amplifier 320a in the first stage and the data amplifier 320b in the second stage, thereby causing the data amplifier 320a in the first stage to amplify the intermediate data as data having the resolution of 4K, and then causing the data amplifier 320b in the second stage to amplify the data having the resolution of 4K as the final data having the resolution of 8K.

Optionally, the driver 300 may further include a frame buffer 330 having an operation mode of first-in first-out, and the frame buffer 330 may buffer a preset number of frames of the final data.

Frames of the final data are buffered in the frame buffer, and when the number of stored frames reaches the preset number of frames, the intermediate data is output in sequence according to the buffered order. The number of frames of data in the frame buffer 330 is always unchanged, thereby effectively avoiding the phenomenon of image loss or image damage caused by the second resolution of the intermediate data being switched or by the delay or congestion of a video transmission network. A damaged image frame is automatically discarded without entering the frame buffer 330. Thus, when a frame is lost in error due to data processing or network transmission, the normal display is not affected.

As shown in FIG. 2, the frame buffer 330 is connected between the driving unit 340 and the data amplifier in the last stage (e.g., the data amplifier 320b in the second stage).

As described above, as an exemplary embodiment, the data transmitter 230 includes the data distributor 231 and the plurality of first transmission interfaces 232. Correspondingly, the display device further includes a data receiver 400, and the data receiver 400 may receive the intermediate data and transmit the intermediate data to the driver 300.

For example, the data receiver 400 includes an interface selector 410 and a plurality of second transmission interfaces 420, and the plurality of second transmission interfaces 420 are connected in one-to-one correspondence with the plurality of first transmission interfaces 232. The interface selector 410 may transmit a third enabling signal to at least one second transmission interface 420 of the plurality of second transmission interfaces 420 according to the second resolution, and the at least one second transmission interface 420 receiving the third enabling signal may transmit the received data to the driver 300. For example, the at least one second transmission interface 420 receiving the third enabling signal may transmit the received data to the data amplifier 320a in the first stage of the driver 300.

As described above, the second mode selector 310 may further receive mode information (e.g., an enabling signal) transmitted by the first mode selector 100, so as to control an operation mode of the data amplifiers in the plurality of stages (e.g., a data amplifier among the data amplifiers in the plurality of stages that needs to amplify data) and an operation mode of the interface selector (e.g., a mode in which the interface selector 410 receives data from at least one of the second transmission interfaces 420).

Further, the second mode selector 310 may further receive the frame synchronization information transmitted by the data receiver 400. The second mode selector 310 may determine the start of an image frame according to the frame synchronization information if the second resolution needs to be changed, and allows the second resolution to be changed after the end of the current image frame and before the start of the next image frame. In this way, it is possible to prevent an operation mode (e.g., the second resolution)

from being changed during processing one frame of image, thereby avoiding a phenomenon of tearing or damaging an image.

Figure 8:
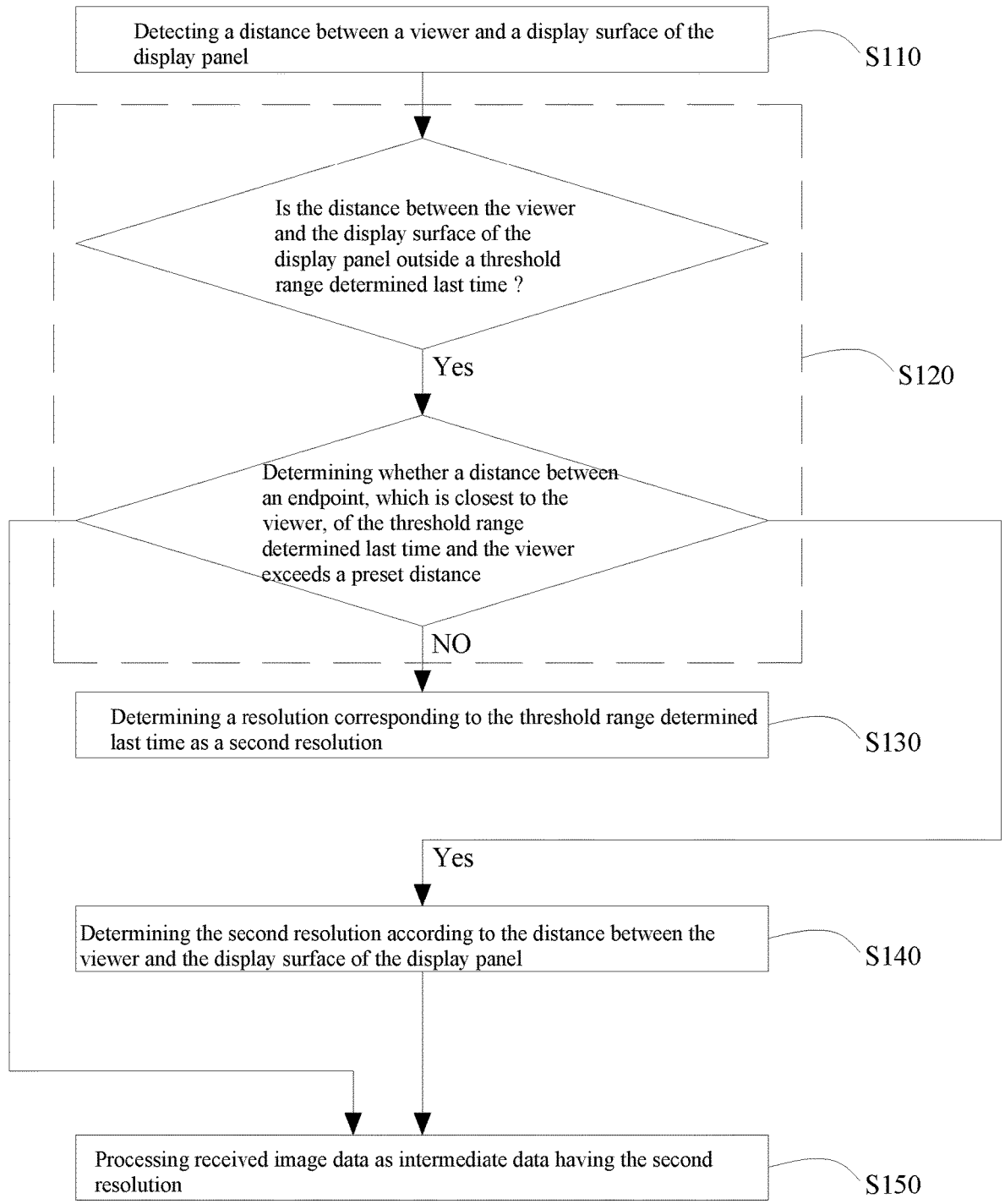
FIG. 8 is a schematic flowchart showing a data processing method according to an embodiment of the present disclosure.

As a third aspect of the present disclosure, there is provided a data processing method for the display device including the display panel 20, and the display panel 20 may have the first resolution. As shown in FIG. 8, the data processing method may include the following steps S110 to S150.

In step S110, a distance between a viewer and the display surface of the display panel 20 is detected.

In step S120, it is determined whether the distance between the viewer and the display surface of the display panel 20 is outside the threshold range determined last time, and in response to the distance between the viewer and the display surface of the display panel 20 being outside the threshold range determined last time, it is determined whether a distance between the endpoint, which is closest to the viewer, of the threshold range determined last time and the viewer exceeds the preset distance L.

In a case where it is determined that the distance between the endpoint, which is closest to the viewer, of the threshold range determined last time and the viewer does not exceed the preset distance, in step S130, the second resolution is determined as the resolution corresponding to the threshold range determined last time.

In a case where it is determined that the distance between the endpoint, which is closest to the viewer, of the threshold range determined last time and the viewer exceeds the preset distance, in step S140, the second resolution is determined according to the distance between the viewer and the display surface of the display panel.

In step S150, the received image data is processed as intermediate data having the second resolution.

In the data processing method provided by the present disclosure, whether the second resolution is adjusted or not may be determined according to a movement distance of the viewer during watching (or viewing) displayed images, and thus the stability of data transmission is ensured and the phenomenon of unsmoothness in the display process is avoided, while the viewing effect is ensured.

The data processor provided by the present disclosure may perform the data processing method provided by the present disclosure. For example, the distance detector 110 of the first mode selector 100 may perform step S110, the comparator 120 of the first mode selector 100 may perform step S120, the transmission resolution adjustor 130 of the first mode selector 100 may perform step S130 and step S140, and the player 200 may perform step S150.

As an exemplary embodiment, the display panel 20 has the first resolution, and before the distance between the viewer and the display surface of the display panel 20 is detected (i.e., step S110), the data processing method may further include the following step S100.

In step S100, a plurality of distance thresholds and a plurality of resolution thresholds are preset, wherein any adjacent two of the distance thresholds form a threshold range, each threshold range corresponds to one of the plurality of resolution thresholds, and the plurality of resolution thresholds are decreased as distances between threshold ranges and the display surface of the display panel 20 are increased.

Correspondingly, the step of determining the second resolution according to the distance between the viewer and the display surface of the display panel (i.e., step S140) may include: determining a threshold range where (or within which) the distance between the viewer and the display surface of the display panel 20 falls; and determining a resolution threshold corresponding to the determined threshold range as the second resolution according to the preset mapping relationship between threshold ranges and the plurality of resolution thresholds.

As an exemplary embodiment, the second resolution is less than or equal to the first resolution.

Optionally, the preset distance L does not exceed the height H of the display panel 20, as shown in FIG. 3.

In addition, the data processing method may further include: determining the start of an image frame according to the frame synchronization information if the second resolution needs to be changed, and changing the second resolution after the end of the current image frame and before the start of the next image frame. In this way, it is possible to prevent an operation mode (e.g., the second resolution) from being changed during processing one image frame, thereby avoiding the phenomenon of tearing or damaging an image.

Figure 9:
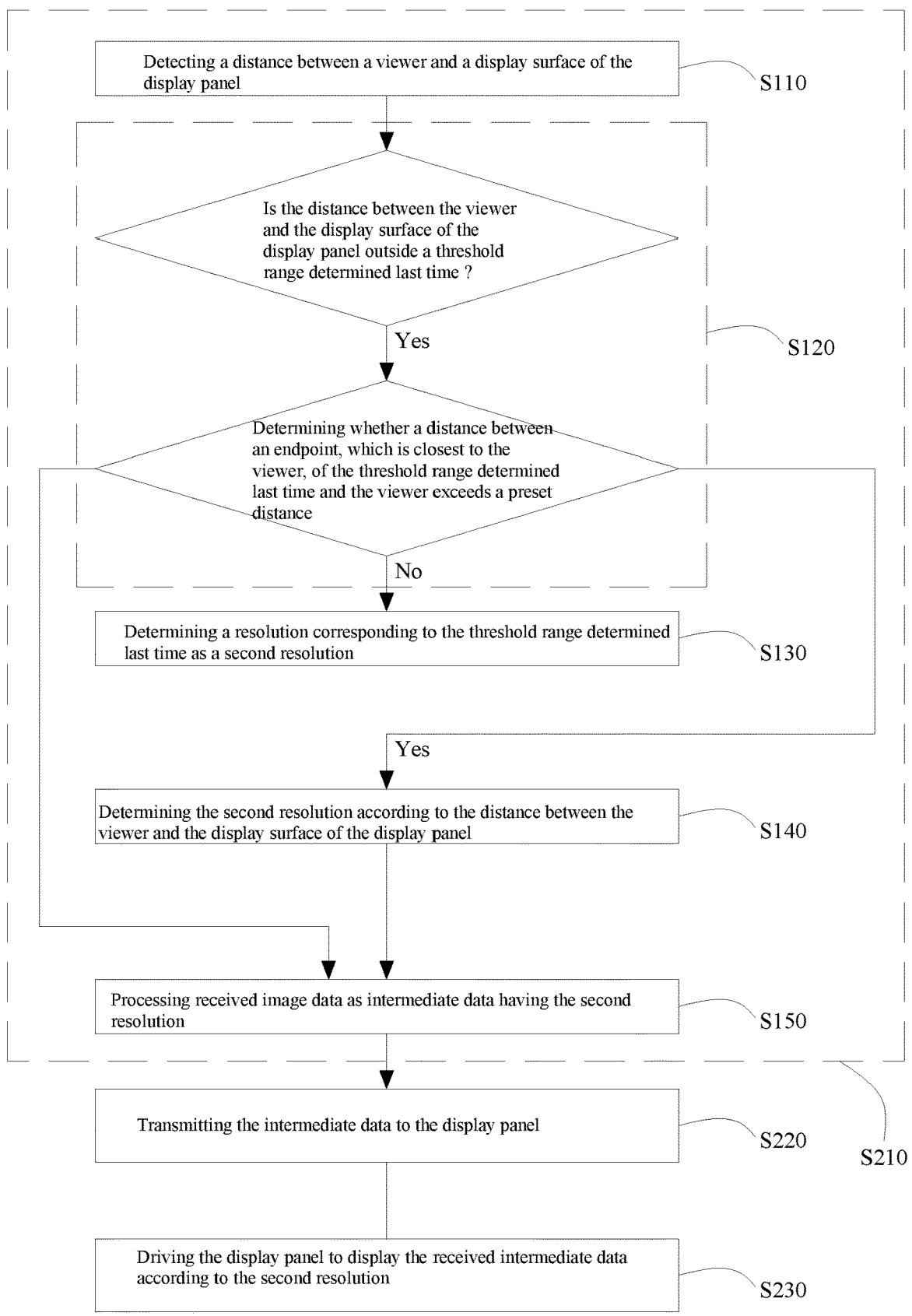
FIG. 9 is a schematic flowchart showing a driving method for a display panel of a display device according to an embodiment of the present disclosure.

As a fourth aspect of the present disclosure, a driving method for the display panel is provided. As shown in FIG. 9, the driving method may include the following steps S210 to S230.

In step S210, image data is processed by using the above-described data processing method (as shown in FIG. 8) provided by the present disclosure to obtain the intermediate data.

In step S220, the intermediate data is transmitted to the driver 300 for driving the display panel.

In step S230, the driver 300 may drive the display panel 20 to display the intermediate data at the second resolution.

When the driving method is used for driving the display panel to display, the display panel may be prevented from undergoing unsmooth display when displaying pictures, and the second resolution does not need to be changed frequently. In addition, an operation mode (e.g., the second resolution) may be prevented from being changed during processing one image frame, thereby avoiding the phenomenon of tearing or damaging an image.

In the present disclosure, the relationship between the second resolution and the first resolution is not particularly limited. For example, when the second resolution is smaller than the first resolution, the step in which the driver drives the display panel to display the received intermediate data at the second resolution (step S230) may include the following steps:

amplifying the intermediate data to obtain final data such that an image corresponding to the final data has a resolution equal to the current second resolution; and driving the display panel to display according to the final data.

As a fifth aspect of the present disclosure, there is provided a non-transitory computer readable storage medium for storing an executable program, and the executable program (e.g., when executed by a processor) is for implementing the above-described data processing method according to any one of the foregoing embodiments of the present disclosure.

As a sixth aspect of the present disclosure, there is provided an electronic device including a processor (e.g., a general purpose processor, a central processing unit (CPU), an application processor (AP), or the like) and a memory (e.g., the memory 700). The memory may store a computer program, and the processor may execute the computer program stored in the memory to implement the data processing method according to any one of the foregoing embodiments of the present disclosure. For example, among the various components shown in FIG. 2, the plurality of first transmission interfaces 232, the plurality of second transmission interfaces 420, the distance detector 110, the memory 700 may be implemented by hardware or by a combination of hardware and software, and the remaining components may be implemented by the processor executing the computer program stored in the memory.

The foregoing embodiments of the present disclosure may be combined with each other in a case of no explicit conflict.

It should be understood that the above embodiments are merely exemplary embodiments adopted to explain the principles of the present disclosure, and the present disclosure is not limited thereto. It will be apparent to one of ordinary skill in the art that various changes and modifications may be made without departing from the scope of the present disclosure as defined in the appended claims, and such changes and modifications also fall within the scope of the present disclosure.

What is claimed is:

1. A data processor for a display device, the display device comprising a display panel having a first resolution, wherein the data processor comprises a processor, a memory, and a computer program stored in the memory, when executing the computer program the processor functions as a first mode selector and a player, and the first mode selector comprises a distance detector, a comparator, and a transmission resolution adjustor;

the distance detector is configured to detect a distance between a viewer and a display surface of the display panel;

the comparator is configured to determine whether the distance between the viewer and the display surface of the display panel is outside a threshold range determined last time, and in response to the distance between the viewer and the display surface of the display panel being outside the threshold range determined last time, determine whether a distance between an endpoint, which is closest to the viewer, of the threshold range determined last time and the viewer exceeds a preset distance;

the transmission resolution adjustor is configured to determine a resolution corresponding to the threshold range determined last time as a second resolution in a case where the comparator determines that the distance between the endpoint, which is closest to the viewer, of the threshold range determined last time and the viewer does not exceed the preset distance, and is further configured to determine the second resolution according to the distance between the viewer and the display surface of the display panel in a case where the comparator determines that the distance between the endpoint, which is closest to the viewer, of the threshold range determined last time and the viewer exceeds the preset distance; and the player is configured to process received external image data as intermediate data having the second resolution;

wherein the player comprises a mode receiver and a plurality of data compressors cascaded to each other in a plurality of stages;

the data compressor in each of the plurality of stages is configured to compress received data as data such that a resolution of an image corresponding to the data is equal to one n-th of a resolution of an image corresponding to the received data, where n is a positive integer, an input terminal of the data compressor in a first stage of the plurality of stages is configured to receive external data, an output terminal of the data compressor in each of the plurality of stages is configured to output compressed data, and in two data compressors in any adjacent two of the plurality of stages, the input terminal of the data compressor in a next stage is electrically connected to the output terminal of the data compressor in a previous stage;

the mode receiver is configured to determine at least one data compressor among the plurality of data compressors that is required for compressing the external image data as the intermediate data according to the second resolution determined by the transmission resolution adjustor, and transmit a first enabling signal to the at least one data compressor that is determined to be required; and the at least one data compressor receiving the first enabling signal is configured to compress the received data and output compressed data, and in a case where at least two of the data compressors cascaded to each other in the plurality of stages of the player receive the first enabling signal, the data compressor in a previous stage is configured to output the compressed data to the data compressor in a next stage, and the data compressor in a last stage receiving the first enabling signal is configured to output the intermediate data.

2. The data processor according to claim 1, further comprising a threshold setter, wherein the threshold setter is configured to preset a plurality of distance thresholds and a plurality of resolution thresholds, such that any adjacent two of the plurality of distance thresholds form a threshold range, each threshold range corresponds to one of the plurality of resolution thresholds, the plurality of resolution thresholds are decreased as distances between threshold ranges and the display surface of the display panel are increased, and any one of the plurality of resolution thresholds does not exceed the first resolution; and the transmission resolution adjustor is further configured to determine a threshold range within which the distance between the viewer and the display surface of the display panel falls, and determine, according to a preset mapping relationship between the threshold ranges and the plurality of resolution thresholds, a resolution threshold corresponding to the threshold range as the second resolution.

3. The data processor according to claim 1, wherein the preset distance does not exceed a height of the display panel.

4. The data processor according to claim 1, wherein the player further comprises a data transmitter configured to transmit the intermediate data to the display panel, the data transmitter comprises a data distributor and a plurality of first transmission interfaces; and the mode receiver is further configured to receive mode information transmitted by the first mode selector, so as to control an operation mode of the plurality of data compressors and an operation mode of the data distributor.

5. The data processor according to claim 1, further comprising a data reader, wherein the data reader is configured to read the external image data from a memory and transmit frame synchronization information to the mode receiver; and the mode receiver is configured to determine a start of an image frame according to the frame synchronization information in a case where the second resolution needs to be changed, and allow the second resolution to be changed after a current image frame ends and before a next image frame starts.

6. A data processor for a display device, the display device comprising a display panel having a first resolution, wherein the data processor comprises a processor, a memory, and a computer program stored in the memory, when executing the computer program the processor functions as a first mode selector and a player, and the first mode selector comprises a distance detector, a comparator, and a transmission resolution adjustor;

the distance detector is configured to detect a distance between a viewer and a display surface of the display panel;

the comparator is configured to determine whether the distance between the viewer and the display surface of the display panel is outside a threshold range determined last time, and in response to the distance between the viewer and the display surface of the display panel being outside the threshold range determined last time, determine whether a distance between an endpoint, which is closest to the viewer, of the threshold range determined last time and the viewer exceeds a preset distance;

the transmission resolution adjustor is configured to determine a resolution corresponding to the threshold range determined last time as a second resolution in a case where the comparator determines that the distance between the endpoint, which is closest to the viewer, of the threshold range determined last time and the viewer does not exceed the preset distance, and is further configured to determine the second resolution according to the distance between the viewer and the display surface of the display panel in a case where the comparator determines that the distance between the endpoint, which is closest to the viewer, of the threshold range determined last time and the viewer exceeds the preset distance; and the player is configured to process received external image data as intermediate data having the second resolution, wherein the player further comprises a data transmitter configured to transmit the intermediate data to the display panel, the data transmitter comprises a data distributor and a plurality of first transmission interfaces, each of the plurality of first transmission interfaces is configured to transmit a preset number of bytes of data, the data distributor is configured to divide the intermediate data into groups of data according to a size of the intermediate data, and distribute the groups of data to at least one of the plurality of first transmission interfaces.

7. A display device, comprising:
the data processor according to claim 1;
the display panel; and
a driver for driving the display panel;
wherein the driver is configured to, after receiving the intermediate data, process the intermediate data to obtain final data corresponding to an image having the second resolution, and drive the display panel to display according to the final data.

8. The display device according to claim 7, wherein the driver comprises a second mode selector, a driving unit, and a plurality of data amplifiers cascaded to each other in a plurality of stages, wherein the data amplifier in each of the plurality of stages is configured to amplify received data as data such that a resolution of an image corresponding to the data is equal to m times of a resolution of an image corresponding to the received data, where m is a positive integer, the data amplifier in a first stage of the plurality of stages is configured to receive the intermediate data, an output terminal of the data amplifier in each of the plurality of stages is configured to output amplified data, and in two data amplifier in any adjacent two of the plurality of stages, an input terminal of the data amplifier in a next stage is electrically connected to the output terminal of the data amplifier in a previous stage;

the second mode selector is configured to determine at least one data amplifier among the plurality of data amplifiers that is required for amplifying the intermediate data as the final data according to the intermediate data, and transmit a second enabling signal to the at least one data amplifier determined to be required;

the at least one data amplifier receiving the second enabling signal is configured to amplify the intermediate data and output amplified data, and in a case where the data amplifiers in at least two of the plurality of stages of the driver receive the second enabling signal, the data amplifier in a previous stage is configured to output the amplified data to the data amplifier in a next stage, and the data amplifier in a last stage receiving the second enabling signal is configured to output the final data; and the driving unit is configured to drive the display panel to display by using the final data.

9. The display device according to claim 8, further comprising a data receiver configured to receive the intermediate data and transmit the intermediate data to the driver, wherein the data receiver comprises an interface selector and a plurality of second transmission interfaces, and the plurality of second transmission interfaces are connected in one-to-one correspondence with the plurality of first transmission interfaces of the data transmitter of the player; and the second mode selector is further configured to receive mode information transmitted by the first mode selector, so as to control an operation mode of the plurality of data amplifiers and an operation mode of the interface selector.

10. The display device according to claim 9, wherein
the second mode selector is further configured to receive frame synchronization information transmitted by the data receiver; and the second mode selector is configured to determine a start of an image frame according to the frame synchronization information in a case where the second resolution needs to be changed, and allow the second resolution to be changed after a current image frame ends and before a next image frame starts.

11. The display device according to claim 7, wherein
the player further comprises a data transmitter configured to transmit the intermediate data to the display panel, the data transmitter comprises a data distributor and a plurality of first transmission interfaces, each of the plurality of first transmission interfaces is configured to transmit a preset number of bytes of data, the data distributor is configured to divide the intermediate data into groups of data according to a size of the intermediate data, and distribute the groups of data to at least one of the plurality of first transmission interfaces;

the display device further comprises a data receiver configured to receive the intermediate data and transmit the intermediate data to the driver;

the data receiver comprises an interface selector and a plurality of second transmission interfaces, and the plurality of second transmission interfaces are connected in one-to-one correspondence with the plurality of first transmission interfaces of the data transmitter of the player; and the interface selector is configured to transmit a third enabling signal to at least one second transmission interface of the plurality of second transmission interfaces according to the second resolution, and the at least one second transmission interface receiving the third enabling signal is configured to transmit received data to the driver.

12. A data processing method for a display device, wherein the display device comprises a display panel having a first resolution, and the data processing method comprises:

detecting a distance between a viewer and a display surface of the display panel;

determining whether the distance between the viewer and the display surface of the display panel is outside a threshold range determined last time, and in response to the distance between the viewer and the display surface of the display panel being outside the threshold range determined last time, determining whether a distance between an endpoint, which is closest to the viewer, of the threshold range determined last time and the viewer exceeds a preset distance;

determining a resolution corresponding to the threshold range determined last time as a second resolution in a case where it is determined that the distance between the endpoint, which is closest to the viewer, of the threshold range determined last time and the viewer does not exceed the preset distance, and determining the second resolution according to the distance between the viewer and the display surface of the display panel in a case where it is determined that the distance between the endpoint, which is closest to the viewer, of the threshold range determined last time and the viewer exceeds the preset distance;

processing received image data as intermediate data having the second resolution; and determining a start of an image frame according to frame synchronization information in a case where the second resolution needs to be changed, and changing the second resolution after a current image frame ends and before a next image frame starts.

13. The data processing method according to claim 12, further comprising, prior to the detecting a distance between a viewer and a display surface of the display panel: presetting a plurality of distance thresholds and a plurality of resolution thresholds, such that any adjacent two of the plurality of distance thresholds form a threshold range, each threshold range corresponds to one of the plurality of resolution thresholds, the plurality of resolution thresholds are decreased as distances between threshold ranges and the display surface of the display panel are increased, and any one of the plurality of resolution thresholds does not exceed the first resolution, wherein the determining the second resolution according to the distance between the viewer and the display surface of the display panel comprises: determining a threshold range within which the distance between the viewer and the display surface of the display panel falls, and determining, according to a preset mapping relationship between the threshold ranges and the plurality of resolution thresholds, a resolution threshold corresponding to the threshold range as the second resolution.

14. The data processing method according to claim 12, wherein the preset distance does not exceed a height of the display panel.

15. A driving method for a display panel, comprising:

processing data of an image by using the data processing method according to claim 12;

transmitting the intermediate data to a driver for driving the display panel; and driving, by the driver, the display panel to display the intermediate data according to the second resolution.

16. The driving method according to claim 15, wherein in a case where the second resolution is less than the first resolution, the driving, by the driver, the display panel to display the intermediate data according to the second resolution comprises:

amplifying the intermediate data to obtain final data, wherein the final data corresponds to an image that has a resolution equal to the first resolution; and driving the display panel to display according to the final data.

17. A non-transitory computer readable storage medium, having an executable program stored thereon, wherein the executable program is configured to implement the data processing method according to claim 12.

18. An electronic device, comprising a processor and a memory, wherein the memory is configured to store a computer program; and the processor is configured to execute the computer program stored in the memory to implement the data processing method according to claim 12.

19. A display device, comprising:

the data processor according to claim 6;

the display panel; and a driver for driving the display panel;

wherein the driver is configured to, after receiving the intermediate data, process the intermediate data to obtain final data corresponding to an image having the second resolution, and drive the display panel to display according to the final data.

* * * * *